United States Patent [19]

Sinnhuber et al.

[11] Patent Number: 5,000,509
[45] Date of Patent: Mar. 19, 1991

[54] SAFETY DEVICE FOR A MOTOR VEHICLE TO PROTECT PASSENGERS DURING SIDE COLLISION

[75] Inventors: Ruprecht Sinnhuber, Gifhorn; Jürgen Wiemann, Braunschweig, both of Fed. Rep. of Germany

[73] Assignee: Volkswagen AG, Fed. Rep. of Germany

[21] Appl. No.: 404,094

[22] Filed: Sep. 7, 1989

[30] Foreign Application Priority Data

Sep. 7, 1988 [DE] Fed. Rep. of Germany ....... 3830394

[51] Int. Cl.⁵ ............................................. B60R 27/00
[52] U.S. Cl. .................................... 296/188; 296/68.1
[58] Field of Search ............... 296/188, 63, 68.1, 146, 296/189

[56] References Cited

U.S. PATENT DOCUMENTS

| | | | |
|---|---|---|---|
| 3,776,588 | 12/1973 | Sobajima et al. | 296/146 |
| 3,944,276 | 3/1976 | de Rosa et al. | 296/188 X |
| 4,231,607 | 11/1980 | Bohlin | 296/63 |
| 4,272,103 | 6/1981 | Schmid et al. | 296/189 X |
| 4,307,911 | 12/1981 | Pavlik | 296/146 X |
| 4,438,969 | 3/1984 | Kamijo et al. | 296/188 X |
| 4,451,078 | 5/1984 | Maeda | 296/188 |
| 4,462,633 | 7/1984 | Maeda | 296/146 X |
| 4,512,604 | 4/1985 | Maeda et al. | 296/68.1 |

FOREIGN PATENT DOCUMENTS

| | | | |
|---|---|---|---|
| 0235635 | 2/1987 | European Pat. Off. | |
| 2444018 | 3/1976 | Fed. Rep. of Germany | 296/146 |
| 3151861 | 7/1983 | Fed. Rep. of Germany | |
| 3425776 | 1/1986 | Fed. Rep. of Germany | 296/188 |
| 3111045 | 1/1988 | Fed. Rep. of Germany | |
| 1026800 | 5/1953 | France | 296/63 |
| 2424146 | 12/1979 | France | 296/63 |
| 404023 | 5/1943 | Italy | 296/63 |
| 74718 | 4/1988 | Japan | 296/146 |

Primary Examiner—Margaret A. Focarino
Assistant Examiner—Gary C. Hoge
Attorney, Agent, or Firm—Brumbaugh, Graves, Donohue & Raymond

[57] ABSTRACT

In order to protect passengers during an impact affecting a side of a vehicle, a safety device is provided in a motor vehicle. The safety device comprises an impact-resistant, low-deformation body part and a support structure adjacent to the low-deformation body part attached to the vehicle body. The support structure exhibits extremely low deformation in a direction perpendicular to a direction of travel so that impact energy resulting from a side impact may be transferred through the vehicle by engagement of the low-deformation body part with the low-deformation support structure. As a result of these features, the safety device opposes penetration of an impacting object into a passenger compartment and provides good collision protection and force transfer.

18 Claims, 2 Drawing Sheets

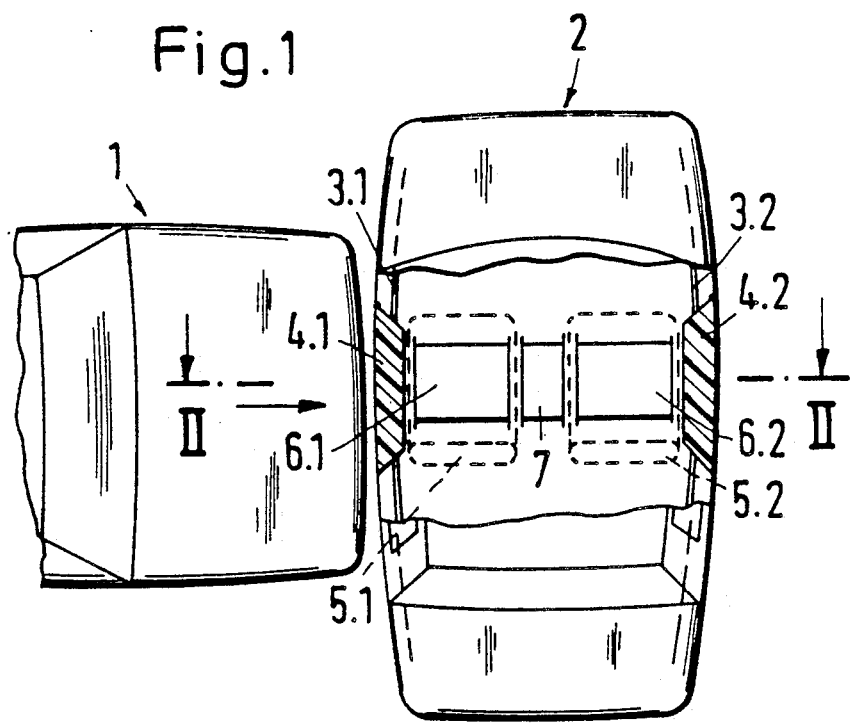
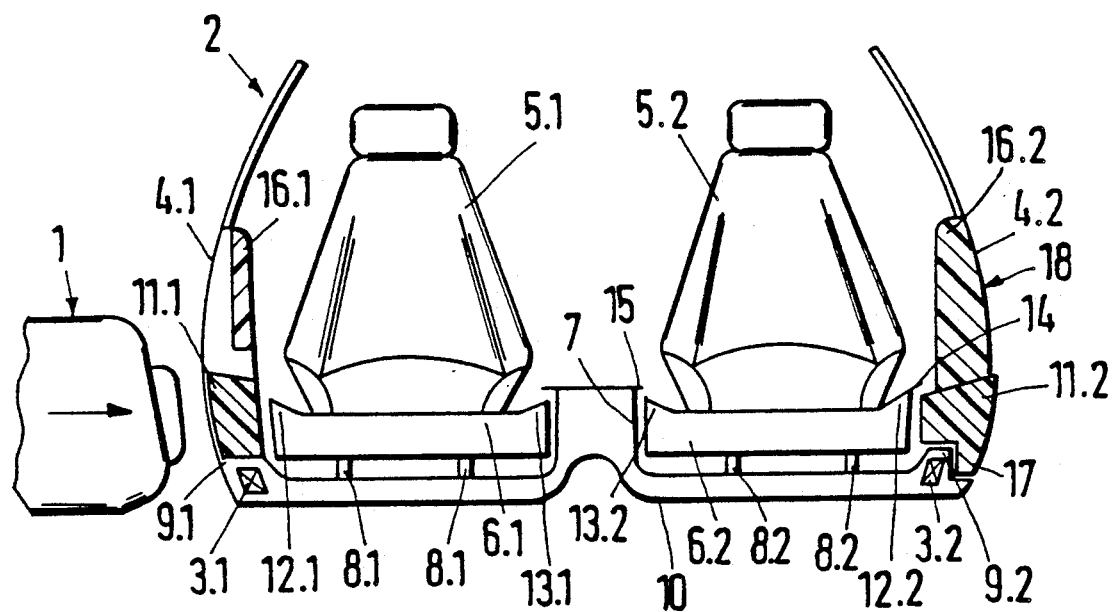

SAFETY DEVICE FOR A MOTOR VEHICLE TO PROTECT PASSENGERS DURING SIDE COLLISION

BACKGROUND OF THE INVENTION

This invention relates to safety devices for motor vehicles which protect passengers during an impact affecting the vehicle.

As a result of space limitations, the sides of a vehicle have relatively short lateral deformable distances. Thus, serious injuries to passengers may result if the vehicle is struck from a side. The passengers in a vehicle are especially exposed to considerable injury hazard when an impacting object penetrates into a passenger compartment. In order to protect the passengers, a greater resistance to lateral penetration of an impacting object should be provided. It is well known that bend-resistant supports or beam barriers can be built into the sides of a vehicle.

European Published Application No. A1 02 35 635 discloses a safety device which transfers most of the impact energy of a lateral impacting object to a door sill. Since vehicle door sills usually have a relatively high degree of rigidity, a door sill is effective to reduce significantly the penetration depth of the impacting object during a lateral impact.

Another arrangement is shown in German Offenlegungsschrift No. 31 51 861, which discloses vehicle doors designed so that the door sill is greatly relied upon for absorption of the impact energy during a lateral impact. The door sill is highly torsion-resistant because of its load-bearing function.

German Patent Specification 31 11 045 discloses a safety device using a beam tie arrangement to transfer the impact energy to damping elements of the vehicle. The beam tie arrangement is intended to function as an impact protection device without low-deformation supports and energy-absorbing crusher zones.

SUMMARY OF THE INVENTION

Accordingly, an object of the invention is to provide a new and improved safety device for passenger vehicles.

Another object of the invention is to further enhance the protection of passengers during an impact affecting a side of the vehicle.

These and other objects of the invention are attained by providing a safety device for a motor vehicle including an impact-resistant, low-deformation body part in the vicinity of a support structure which has a high resistance to deformation in a direction transverse to the direction of motion of the vehicle.

BRIEF DESCRIPTION OF THE DRAWINGS

Further objects and advantages of the invention will be apparent from a reading of the following description of preferred embodiments in conjunction with the accompanying drawings in which:

FIG. 1 is a schematic diagram illustrating a lateral impact of one vehicle by another vehicle;

FIG. 2 is a sectional view of the diagram shown in FIG. 1 illustrating an impacted vehicle provided with representative embodiments of the safety device of the invention.

For convenience of reference, like components, elements, and features in the figures are designated by the same reference numerals.

DESCRIPTION OF THE PREFERRED EMBODIMENTS

Figure 2A:
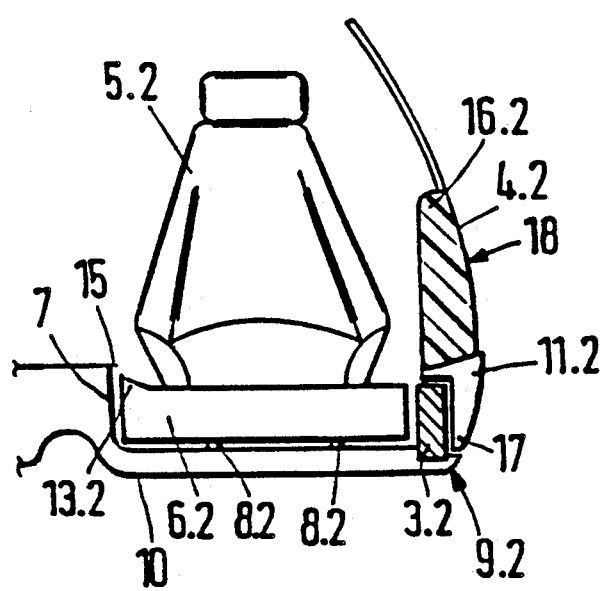
FIG. 2a is a fragmentary sectional view similar to that of FIG. 2 showing another embodiment of the invention.

In the diagram shown in FIG. 1, an impacting vehicle 1 frontally collides with a side of a safety vehicle 2. The safety vehicle 2 includes two longitudinal side supports 3.1 and 3.2 having a high bending resistance which are integrated into the body of safety vehicle 2. Two seats 5.1 and 5.2, provided with integrated braces 6.1 and 6.2, which are buckle-resistant in the lateral direction, are located between opposite vehicle doors 4.1 and 4.2 provided with low-deformation sections. A low-deformation element 7, which may be a central tunnel provided with reinforcements, is located between the buckle-resistant braces 6.1 and 6.2.

When the impacting vehicle 1 collides with the left side of the safety vehicle 2, as shown in FIG. 1, the vehicle door 4.1, which has a low-deformation section, is impacted by the force of the collision. In this regard, the vehicle door 4.1 of the safety vehicle can be arranged so that part of the impact energy of impacting vehicle 1 is first reduced by deformation of the longitudinal support 3.1. According to the invention, the safety vehicle is arranged so that a much greater portion of the remaining impact energy is absorbed by the front or by the rear area of the impacting vehicle 1. In addition, a smaller portion of the remaining impact energy is transferred via the vehicle door 4.1, which has a low-deformation section, the two buckle-resistant braces 6.1 and 6.2, and the low-deformation element 7, to the other side of the safety vehicle 2 where the remaining impact energy can be converted into deformation energy. However, it is also conceivable that other vehicle body areas near the low-deformation element 7 have already reduced part of the impact energy.

With the safety device of the invention, the low-deformation section of the door 4.1 reduces the penetration depth of the impacting vehicle 1 into the passenger compartment of the safety vehicle 2. Referring to FIG. 1, the impact of the vehicle door 4.1 against the buckle-resistant brace 6.1 allows a passenger seated on the seat 5.1 to avoid the point of impact, thereby reducing considerably the injury hazard. Moreover, the low-deformation element 7 advantageously pushes the seat 5.2, along with the passenger in that seat, away from the point of impact. Thus, the distance between the seats 5.1 and 5.2 remains almost unchanged, and the passengers cannot injure each other. In this way, passenger protection is greatly improved with the safety device of the safety vehicle 2 since the force of impact of impacting vehicle 1 can be absorbed by body areas far removed from the point of impact and since relative motions of the passengers seated side by side cannot endanger them.

Providing a more detailed illustration of the embodiments of the safety device of the invention, FIG. 2 shows a sectional view of the safety vehicle 2 taken along a line perpendicular to a direction of travel. The buckle-resistant braces 6.1 and 6.2, shown as seat frames, are arranged on two schematically illustrated seat slide guides 8.1 and 8.2. These slide guides 8.1 and 8.2 are attached to a body floor 10 which is also provided with two door sills 9.1 and 9.2. The vehicle door 4.1 has a low-deformation section 11.1 totally surrounded by an outer door shell and by an inner door shell. Such a low-deformation door section may also have the form of the door section 11.2 arranged on the vehicle door 4.2. The low-deformation section 11.2 is not an integral part of the vehicle door 4.2; rather, the section 11.2 is an independent component mounted on the vehicle door 4.2. Another design characteristic of the vehicle door 4.2 is a claw-like projection 17, by which the vehicle door 4.2 engages the door sill 9.2 during a lateral impact. Wedgeshaped widenings 12.1 and 12.2 at the outer ends of the buckle-resistant braces 6.1 and 6.2 may be impacted by the door sections 11.1 and 11.2. The ends of the braces 6.1 and 6.2 adjacent to the low-deformation element 7 also have wedgeshaped widenings 13.1 and 13.2 to provide better force absorption. In addition, the buckle-resistant brace 6.2 and the low-deformation element 7 have catch plates 14 and 15, respectively. Finally, the vehicle doors 4.1 and 4.2 have paddings 16.1 and 16.2, respectively.

During an impact of the vehicle 1 against the safety vehicle 2, the low-deformation door section 11.1 is affected first. The impact energy is transferred from this component through the buckle-resistant brace 6.1, the low-deformation element 7, the buckle-resistant brace 6.2, and the low-deformation door section 11.2 to the other side of the vehicle body. The slide guides 8.1 and 8.2 are arranged to provide minimum resistance to lateral movements of the seats 5.1 and 5.2 in case of a lateral impact. The geometry and strength of the catch plates 14 and 15 are arranged so that the components located along the path of impact force flow cannot slide over one another.

The design of the vehicle doors 4.1 and 4.2 is especially important in the safety device of the invention. To passengers on the side of impact, the doors represent a life-saving barrier against an object impacting from outside. Consequently, the design of inner and outer sides of the safety doors requires special consideration. FIG. 2 illustrates two embodiments of the safety door design.

As FIG. 2 shows, the vehicle door 4.1 has a partial padding 16.1 in areas of the door that must be flexible for passenger safety. The low-deformation lower door section 11.1 is totally surrounded by the outer and inner shells of the vehicle door 4.1. However, arrangements in which the low-deformation lower door section 11.1 is fully covered only by the outer shell are also possible. The low-deformation lower door sections 11.1 and 11.2 may, for example, be made of fiber-reinforced synthetic material, of light metal, or of a synthetic material-steel composite. In a lateral impact, the lower edge of the vehicle door 4.1 will be displaced relative to the door sill 9.1. Good collision protection and force transfer, together with light weight, are desirable features for any new design of a vehicle door.

In another embodiment of the safety door, the door 4.2 in FIG. 2 has full padding 16.2. One original feature of the vehicle door 4.2 is its two-part design with an upper part 18 and a low-deformation lower section 11.2. These door sections may be manufactured separately and assembled as independent components into a safety door. Such a safety door is well suited for a safety vehicle equipped with a safety device according to the invention. A door arrangement such as the vehicle door 4.2 can also be used in vehicles using the lower door section 11.2 as impact protection and not as a force transfer element in case of lateral impact. Another feature of the vehicle door 4.2 is the projection 17 on the lower door section 11.2 which provides a claw-like engagement between the door 4.2 and the door sill 9.2. This arrangement allows partial deflection of the impact energy to the longitudinal support 3.2 of the safety vehicle 2. Of course, the individual features of the vehicle doors 4.1 and 4.2 may be combined in any manner.

The design of a safety door must take into account that a front area, a rear area, or a side area of the impacting vehicle may impact against the safety door. In addition to safety considerations, other aspects, such as convenient entry, automated assembly, and possible use of available standard parts, should be taken into account.

The safety device of the invention can also be arranged so that the door sills 9.1 and 9.2 have the main function of transferring impact energy to the buckle-resistant braces 6.1 and 6.2. FIG. 2a shows a similar arrangement in which the door sill 9.2 includes an impact-resistant, low-deformation body part 3.2. This requires the impacting vehicle 1 to have a bend-resistant support perpendicular to the longitudinal direction of the vehicle and approximately at the height of the door sills 9.1 and 9.2, as described in German Offenlegungsschrift No. 36 07 171. The vehicle doors 4.1 and 4.2 can also be designed so that the low-deformation lower door sections 11.1 and 11.2 and the door sills 9.1 and 9.2 impact against the buckle-resistant braces 6.1 and 6.2 jointly.

Although the invention has been described herein with reference to specific embodiments, many modifications and variations of the invention will readily occur to those skilled in the art. Accordingly, all such variations and modifications are included within the intended scope of the invention.

We claim:

1. A safety device for a motor vehicle which protects passengers during impacts affecting a side of the vehicle comprising an impact-resistant, low-deformation body part, a support structure adjacent to the low-deformation body part which exhibits a low-degree of deformation in a direction transverse to the direction of motion of the vehicle so that impact energy resulting from a side impact may be transferred through the vehicle by engagement of the low-deformation body part with the low-deformation support structure and deformable support means supporting the support structure in the vehicle body.

2. A safety device according to claim 1 in which the impact-resistant, low-deformation body part is a part of the door of the vehicle.

3. A safety device according to claim 1 in which the support structure comprises at least one buckle-resistant brace arranged approximately perpendicular to the direction of travel of the vehicle.

4. A safety device according to claim 1 in which the support structure is integrated into a body floor.

5. A safety device according to claim 3 in which the buckle-resistant brace is integrated into a passenger seat of the vehicle.

6. A safety device according to any one of claims 1, 3 and 5 including two seats arranged side by side in a direction transverse to the direction of travel, each seat being provided with a buckle-resistant brace, through which a small part of the impact energy is transferred from the body part on a side of the impacted vehicle to a body area on the other side of the impacted vehicle.

7. A safety device according to claim 6 including a low-deformation element disposed between the buckle-resistant braces and between the seats such that a distance between the seats will not be appreciably reduced during an impact affecting a side of the vehicle.

8. A safety device for a motor vehicle which protects passengers during impacts affecting a side of the vehicle comprising an impact-resistant, low-deformation body part, a support structure adjacent to the low-deformation body part which exhibits a low degree of deformation in a direction transverse to the direction of motion of the vehicle wherein the impact-resistant, low-deformation body part is a lower section of a vehicle door and including a wedge-shaped projection on the inner side of the vehicle door to reduce its deformability and to place it close to the support structure.

9. A safety device for a motor vehicle which protects passengers during impacts affecting a side of the vehicle comprising an impact-resistant, low-deformation body part and a support structure adjacent to the low-deformation body part which exhibits a low degree of deformation in a direction transverse to the direction of motion of the vehicle so that impact energy resulting from a side impact may be transferred through the vehicle by engagement of the low-deformation body part with the low-deformation support structure wherein the impact-resistant low-deformation body part is a part of the door of the vehicle and a wedge-shaped widening is provided on the buckle-resistant brace facing the vehicle door so that an impact force is transferred from the vehicle door to the buckle-resistant brace.

10. A safety device according to claim 9 in which a low-deformation lower section of the vehicle door is impact-resistant.

11. A safety device according to claim 10 in which the low-deformation lower door section comprises a fiber-reinforced synthetic material.

12. A safety device according to claim 10 in which the low-deformation lower door section comprises a light metal.

13. A safety device according to claim 10 in which the low-deformation lower door section comprises a synthetic material-steel composite.

14. A safety device for a motor vehicle which protects passengers during impacts affecting a side of the vehicle comprising an impact-resistant, low-deformation body part, a support structure adjacent to the low-deformation which exhibits a low degree of deformation in a direction transverse to the direction of motion of the vehicle wherein the impact-resistant, low-deformation body part is a lower section of the vehicle door and deformable support means supporting the support structure in the vehicle body.

15. A safety device according to claim 14 in which the low-deformation lower door section is a fiber-reinforced synthetic material.

16. A safety device according to claim 14 in which the low-deformation lower door section comprises a light metal.

17. A safety device according to claim 14 in which the low-deformation lower door section comprises a synthetic material-steel composite.

18. A safety device for a motor vehicle which protects passengers during impacts affecting a side of the vehicle comprising an impact-resistant, low-deformation body part and a support structure adjacent to the low-deformation body part which exhibits a low degree of deformation in a direction transverse to the direction of motion of the vehicle so that impact energy resulting from a side impact may be transferred through the vehicle by engagement of the low-deformation body part with the low-deformation support structure wherein the impact-resistant, low deformation body part is a lower section of a vehicle door and the support structure comprises at least one buckle-resistant brace arranged approximately perpendicular to the direction of travel of the vehicle and wherein a wedge-shaped widening is provided on the buckle-resistant brace facing the vehicle door so that impact force is transferred from the vehicle door to the buckle-resistant brace.

* * * * *